(12) United States Patent
Swala et al.

(10) Patent No.: US 9,657,400 B2
(45) Date of Patent: May 23, 2017

(54) ELECTROLYZER ASSEMBLY METHOD AND SYSTEM

(75) Inventors: Dana Ray Swala, Schenectady, NY (US); Richard Scott Bourgeois, Albany, NY (US); Steven Paraszczak, Clifton Park, NY (US); Donald Joseph Buckley, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 1352 days.

(21) Appl. No.: 12/136,383

(22) Filed: Jun. 10, 2008

(65) Prior Publication Data

US 2009/0301869 A1 Dec. 10, 2009

(51) Int. Cl.
*C25B 9/00* (2006.01)
*B29C 65/34* (2006.01)
(Continued)

(52) U.S. Cl.
CPC .............. *C25B 9/00* (2013.01); *B29C 65/342* (2013.01); *B29C 65/362* (2013.01); *B29C 65/3632* (2013.01); *B29C 66/54* (2013.01); *B29C 66/543* (2013.01); *B29C 66/5414* (2013.01); *B29C 66/91411* (2013.01); *B29C 66/91651* (2013.01); *C25B 9/18* (2013.01); *B29C 65/3476* (2013.01); *B29C 65/3676* (2013.01); *B29C 66/71* (2013.01);
(Continued)

(58) Field of Classification Search
CPC .. C25B 9/066; C25B 9/08; C25B 9/00; C25B 9/18; H01M 8/0271; H01M 8/0273; H01M 8/0276; H01M 8/028; H01M 8/0282; H01M 8/0284; H01M 8/0286; Y02E 60/366; Y10T 29/49002

USPC ....... 204/252–266; 205/628–639; 156/272.2, 156/273.9, 303.1, 379.6, 379.7; 429/469, 429/509, 510
See application file for complete search history.

(56) References Cited

U.S. PATENT DOCUMENTS 3,450,856 A * 6/1969 Winkless et al. ............. 219/633
4,090,939 A 5/1978 Nicolas et al.
(Continued)

OTHER PUBLICATIONS

Electronic Development Labs, Inc., EDL Tool & Die, Typical Linear coefficient of expansion for common Plastics, http://www.edl-inc.com/Plastic%20expansion%20rates.htm, printed Aug. 1, 2008.
(Continued)

*Primary Examiner* — Ciel Thomas
(74) *Attorney, Agent, or Firm* — Jean K. Testa; Fletcher Yoder, P.C.

(57) ABSTRACT

The present techniques provide a novel electrolyzer and methods for welding components of such electrolyzers. The techniques may use conductors, such as resistance wires, placed in paths around the internal structural features and edges of the components. The conductors may be incorporated into the components during manufacture by injection molding, or other molding techniques, or may be tacked or otherwise applied to the surface of the components after manufacture. When current, a field or other excitation is applied to the conductors, the plastic surrounding the wire is melted. If this plastic is in direct contact with an adjoining component, a strong, hermetic seal may be formed between the two components, including the internal structural features.

17 Claims, 6 Drawing Sheets

(51) Int. Cl.
  *B29C 65/36* (2006.01)
  *B29C 65/00* (2006.01)
  *C25B 9/18* (2006.01)
  *B29K 23/00* (2006.01)
  *B29K 25/00* (2006.01)
  *B29K 27/12* (2006.01)
  *B29K 63/00* (2006.01)
  *B29K 69/00* (2006.01)
  *B29K 71/00* (2006.01)
  *B29K 77/00* (2006.01)
  *B29K 79/00* (2006.01)
  *B29K 81/00* (2006.01)

(52) U.S. Cl.
  CPC ...... *B29C 66/919* (2013.01); *B29C 66/91933* (2013.01); *B29C 66/949* (2013.01); *B29K 2023/06* (2013.01); *B29K 2023/12* (2013.01); *B29K 2025/00* (2013.01); *B29K 2027/12* (2013.01); *B29K 2063/00* (2013.01); *B29K 2069/00* (2013.01); *B29K 2071/00* (2013.01); *B29K 2071/12* (2013.01); *B29K 2077/00* (2013.01); *B29K 2079/08* (2013.01); *B29K 2079/085* (2013.01); *B29K 2081/04* (2013.01); *B29K 2081/06* (2013.01); *Y02E 60/366* (2013.01); *Y10T 29/49002* (2015.01)

(56) References Cited

U.S. PATENT DOCUMENTS

| | | | |
|---|---|---|---|
| 4,135,996 A | 1/1979 | Bouy et al. | |
| 4,144,161 A | 3/1979 | Bourgeois | |
| 4,243,497 A | 1/1981 | Nicholas et al. | |
| 4,547,411 A | 10/1985 | Bachot et al. | |
| 4,586,624 A * | 5/1986 | Shaw | 220/613 |
| 4,605,475 A * | 8/1986 | Roberts et al. | 205/633 |
| 4,695,489 A | 9/1987 | Zarnoch et al. | |
| 4,737,257 A * | 4/1988 | Boulton | C25B 11/041 204/242 |
| 4,746,415 A * | 5/1988 | Boulton et al. | 204/253 |
| 5,284,566 A * | 2/1994 | Cuomo et al. | 204/412 |
| 5,500,583 A | 3/1996 | Buckley et al. | |
| 6,235,166 B1 * | 5/2001 | Towe et al. | 204/263 |
| 6,524,452 B1 * | 2/2003 | Clark et al. | 204/254 |
| 6,632,347 B1 | 10/2003 | Buckley et al. | |
| 6,652,731 B2 | 11/2003 | Cobley et al. | |
| 6,736,954 B2 | 5/2004 | Cobley et al. | |
| 6,773,573 B2 | 8/2004 | Gabe et al. | |
| 6,911,068 B2 | 6/2005 | Cobley et al. | |
| 7,188,478 B2 | 3/2007 | Bourgeois | |
| 7,303,660 B2 | 12/2007 | Buckley et al. | |
| 7,381,313 B2 | 6/2008 | Libby et al. | |
| 2005/0058878 A1 * | 3/2005 | Martin | 429/34 |
| 2006/0053792 A1 | 3/2006 | Bourgeois | |
| 2006/0210855 A1 * | 9/2006 | Frank | C25B 9/10 429/434 |
| 2006/0228619 A1 | 10/2006 | Bowen et al. | |
| 2007/0000789 A1 | 1/2007 | Libby et al. | |
| 2007/0122339 A1 | 5/2007 | Kulkarni et al. | |
| 2007/0278108 A1 | 12/2007 | Rosenzweig et al. | |
| 2008/0083614 A1 | 4/2008 | Swalla et al. | |
| 2008/0145746 A1 | 6/2008 | Zappi et al. | |
| 2008/0145749 A1 | 6/2008 | Lacovangelo et al. | |
| 2008/0145755 A1 | 6/2008 | Lacovangelo et al. | |

OTHER PUBLICATIONS

Handy Harman Canada, Comparisons of Materials: Coefficient of Thermal Expansion, http://www.handyharmancanada.com/TheBrazingBook/comparis.htm, printed Oct. 9, 2008.

Wikipedia, The Free Encylopedia, Thermal Expansion, http://en.wikipedia.org/wiki/Thermal_expansion, printed Aug. 1, 2008.

* cited by examiner

ELECTROLYZER ASSEMBLY METHOD AND SYSTEM

STATEMENT REGARDING FEDERALLY SPONSORED RESEARCH & DEVELOPMENT

This invention was made with Government support under contract number DE-FC07-06ID14789 awarded by the Department of Energy. The Government has certain rights in the invention.

BACKGROUND

This invention generally relates to methods of assembling plastic structures, and in particular to a method of welding plastic parts to form various types of electrochemical cells made from such parts, such as electrolyzers.

Electrolyzers are electrochemical devices that serve to separate fluids into constituent parts, typically water into hydrogen and oxygen. In certain electrolyzers, the fluid, which may include water and other electrolytes, are circulated though one or more cells to which an electric current or charge is applied. The constituent hydrogen and oxygen are collected at or near electrode surfaces and eventually are forced to flow out in an effluent stream for storage or use. The throughput of such electrolyzers may vary greatly, but increasingly high throughput is desired for efficient production of industrial quantities of gas.

Certain electrolyzer arrangements have been proposed that use synthetic plastic materials for internal cells in which water is broken into hydrogen and oxygen. Such plastics are a common material used for many structures, as they provide important benefits, such as low-weight, chemical resistance, electrical insulation, and ease of processing. Assemblies made from multiple or complex plastic parts have been available for many years. However, as the complexity of the plastic parts increases, the need for techniques for joining complex plastic parts has increased. Challenges in the effective joining of such plastics are particularly acute for demanding structures such as the internal components of electrolyzers.

Many techniques have been used to join plastic parts together to form larger structures. In many applications, the thermoplastic parts are thermally welded to form assemblies. Welding is a relatively low-cost technique that provides a strong and often hermetically-sealed joint. However, welding generally requires access to the surfaces of the parts that are to be joined to form the structure. When a structure has a complex internal geometry, welding may not sufficiently join the internal structures of the parts. Other welding techniques, including ultrasonic welding, laser welding, induction welding, friction welding and the like, may also require access to the surfaces to be welded.

As welding may not be practical for complex assemblies, plastic parts may be joined by adhesives. However, adhesives often have some disadvantages over welding. For example, the extra materials used for adhesive bonding may add to the overall cost of an assembly. Further, adhesives may not be as strong as the plastics themselves, leading to potential failures at the seam between the parts. Further, adhesives may have a hardening period, or setting time, which adds to the cycle time for producing structures. Finally, any adhesives used must be resistant to the materials contacting the structure, such as alkaline electrolytes.

Complex plastic parts may also be joined by solvent welding. In solvent welding, an appropriate solvent is used to soften the plastic surface, prior to placing the surface in contact with the surface of another part. However, while the solvent used may be lower cost than adhesives, solvent welding shares many of the same disadvantages, including the time required for the solvent to evaporate or diffuse from the plastic and allow the parts to bond and harden.

Accordingly, there is a need for techniques to join complex plastic parts that have complex internal structures, such as electrolyzers.

BRIEF DESCRIPTION OF THE INVENTION

An embodiment of the present techniques provides a method for forming an electrolyzer. The method includes disposing a heat-generating element adjacent to a surface of an electrolyzer cell component. The surface of the electrolyzer cell component is positioned in contact with a surface of an adjoining electrolyzer cell component. The heat-generating element is then heated to soften the surface of the electrolyzer cell component and form a fused interface between the electrolyzer cell components.

Another embodiment provides a method of assembling an electrolyzer stack. The method includes forming a plurality of electrolyzer cells, wherein each electrolyzer cell has a plastic body. A conductor is disposed adjacent to a surface of the plastic body of each of the electrolyzer cells. The plurality of electrolyzer cells are placed in contact with each another to form an electrolysis stack, and the conductors are heated to soften the surface of each of the electrolyzer cells to form a fused interface between each of the electrolyzer cells.

Another embodiment provides an electrolyzer. The electrolyzer includes a plurality of electrolyzer cells adjacent to one another to form internal fluid channels for channeling an electrolyte and oxygen and hydrogen separated from water. A plurality of heat generating elements are placed adjacent to surfaces of the electrolyzer cells and configured to be heated to fuse the electrolyzer cells to one another.

DESCRIPTION OF THE DRAWINGS

These and other features, aspects, and advantages of the present invention will become better understood when the following detailed description is read with reference to the accompanying drawings in which like characters represent like parts throughout the drawing.

DETAILED DESCRIPTION

As discussed in detail below, the present techniques provide a novel electrolyzer and methods for welding components of such electrolyzers. The techniques may use conductors, such as resistance wires, placed in paths around the internal structural features and edges of the components. The conductors may be incorporated into the components during manufacture by injection molding, or other molding techniques, or may be tacked or otherwise applied to the surface of the components after manufacture. When current, a field or other excitation is applied to the conductors, the plastic surrounding the wire is melted. If this plastic is in direct contact with an adjoining component, a strong, hermetic seal may be formed between the two components, including the internal structural features. As a result of the welding process, the embedded conductor becomes a permanent part of the resulting structure.

Figure 1:
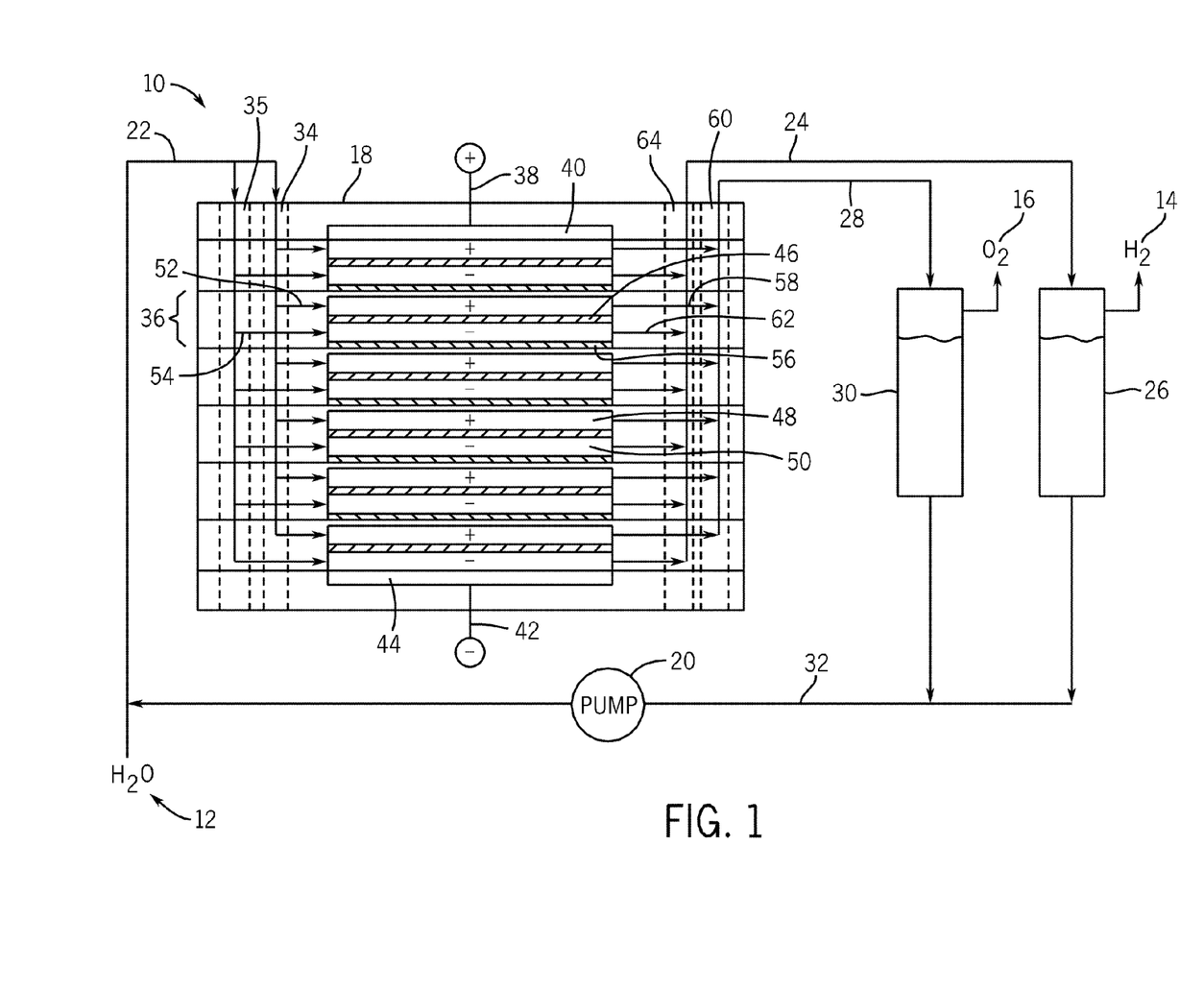
FIG. 1 is a diagrammatic representation of an electrolyzer that may be made using an enhanced welding technique according to an embodiment of present techniques.

An example of a device that may use such conductors for welding is illustrated by the schematic diagram of FIG. 1, which illustrates an exemplary electrolyzer system 10. In the electrolyzer system 10, water 12 is split into hydrogen 14 and oxygen 16 by an electrolyzer stack 18. In operation, a pump 20 maintains a continuous flow of an electrolyte solution 22 through the electrolyzer stack 18. Generally, the electrolyte solution 22 is an aqueous solution of about 20 wt % to about 40 wt. %, or about 30 wt %, potassium hydroxide (KOH) or sodium hydroxide (NaOH), although any number of other ionic solutions may be used. For example, the electrolyte solution 22 may contain lithium hydroxide or other metals.

As a portion of the water 12 is converted to hydrogen 14 and oxygen 16, additional water 12 is added prior to returning the electrolyte solution 22 to the electrolyzer stack 18. As discussed in further detail below, the electrolyzer stack 18 produces a hydrogen stream 24 containing bubbles of hydrogen 14 in the electrolyte solution 22. The hydrogen stream 24 is directed to a hydrogen separator 26, where the hydrogen 14 separates out and is collected for storage or use. The electrolyzer stack 18 also produces a separate oxygen stream 28 containing bubbles of oxygen 16 in the electrolyte solution 22, which is directed to an oxygen separator 30. In the oxygen separator 30, the oxygen 16 is separated from the electrolyte solution 22. The hydrogen separator 26 and oxygen separator 30 may generally function as reservoirs for the electrolyte solution 22. From the separators 26, 30 a return electrolyte solution 32 may be directed to the pump 20, where it is circulated to the electrolyzer stack 18.

In the electrolyzer stack 18, two inlet channels 34, 35 direct the electrolyte solution 22 to a number of individual electrolyzer cells 36. The inlet channels 34, 35 are formed by adjoining holes formed in each of the electrolyzer cells 36. The electrolyzer cells 36 are stacked and electrically connected in series by the electrolyte solution 22. Generally, the electrolyzer cells 36 are joined, for example, by the welding techniques disclosed herein, to form a single structure, in which the inlet channels 34, 35 form one of two sets of flow paths through the structure. Embodiments of the present techniques allow for forming a permanent bond or structure without the problems that may be associated with adhesives.

The electrolyzer stack 18 may contain any number of electrolyzer cells 36, such as 10 in the illustrated example, or 50, 75, 100, or more electrolyzer cells 36 depending on the current available and the production rates desired. At one end of the electrolyzer stack 18, a positive voltage source 38 is connected to a positive current collector 40. At the other end of the stack, a negative voltage source 42 is connected to a negative current collector 44. A metal plate 46 disposed within each of the electrolyzer cells 36 functions as a bipolar electrode. As current is passed through the electrolyte solution 22, a positive charge is induced on the side of the metal plate 46 closest to the positive electrode 38, forming an anodic surface 48. Similarly, a negative charge is induced on the side of the metal plate 46 closest to the negative electrode, forming a cathodic surface 50. The metal plate 46 may have a wire mesh or other surface-increasing structures affixed to the surfaces (such as by welding) to increase the surface area. Further, according to presently contemplated embodiments of the present techniques, the metal plate 46 may have a porous metal layer formed on or disposed over the surface to increase the surface area and, thus, the efficiency of the electrolysis.

Generally, during electrolysis, the difference in charge between the anodic surface 48 and cathodic surface 50 may be on the order of about 1.5 volts to about 2.2 volts. Accordingly, as the electrolyzer cells 36 are in series, the voltage and/or current supplied to the electrolyzer stack 18 will be increased to accommodate the number of electrolyzer cells 36 in the stack. For example, the voltage supplied to the electrolyzer stack 18 may range from about 15 to about 22 volts, for embodiments with 10 electrolyzer cells 36 and range from about 150 volts to about 220 volts, for embodiments with 100 electrolyzer cells 36. Other voltages, and indeed, other charge application schemes may also be envisaged.

During operation of the electrolyzer stack 18, the electrolyzer solution 22 is passed over the anodic surface 48 of the metal plate 46 through a channel 52 formed in each of the electrolyzer cells 36 and connected to inlet channel 34. A second channel 54 directs electrolyte solution 22 from inlet channel 35 over the cathodic surface 50 of the metal plate 46. The water 12 in the electrolyte solution 22 is split into oxygen 16 at the anodic surface 48 and hydrogen 14 at the cathodic surface 50. The bubbles of hydrogen 14 and oxygen 16 are isolated from each other by a liquid permeable membrane 56. The liquid permeable membrane 56 allows water and ions from the electrolyte solution 22 to flow, conducting current between the anodic surface 48 and the cathodic surface 50, but generally prevents the transfer of gas. The liquid permeable membrane 56 may be made from any number of hydrophilic polymers, including, for example, polyacrylamides and polyacrylic acids, among others, and polymers whose surfaces can be treated to make these hydrophilic, such as polysulphones.

The oxygen stream 28 formed at the anodic surface 48, in each of the electrolyzer cells 36, is directed through an oxygen channel 58 to an oxygen outlet channel 60. From the oxygen outlet channel 60, the oxygen stream 28 is directed to the oxygen separator 30. Similarly, the hydrogen stream 24 formed at the cathodic surface 50 of each of the electrolyzer cells 36 is directed through a hydrogen channel 62 to a hydrogen outlet channel 64. From the hydrogen outlet channel 64, the hydrogen stream 24 is directed to the hydrogen separator 26. As for the inlet channels 34, 35, the electrolyzer cells 36 have adjoining holes that form the outlet channels 60, 64 when electrolyzer cells 36 are fused together to form the final structure. Accordingly, it is desirable that the electrolyzer cells 36 be hermetically sealed to each other to prevent mixing of the hydrogen 14 and oxygen 16 from leaks between the outlet channels 60, 64, or other components of the electrolyzer stack 18.

Figure 2:
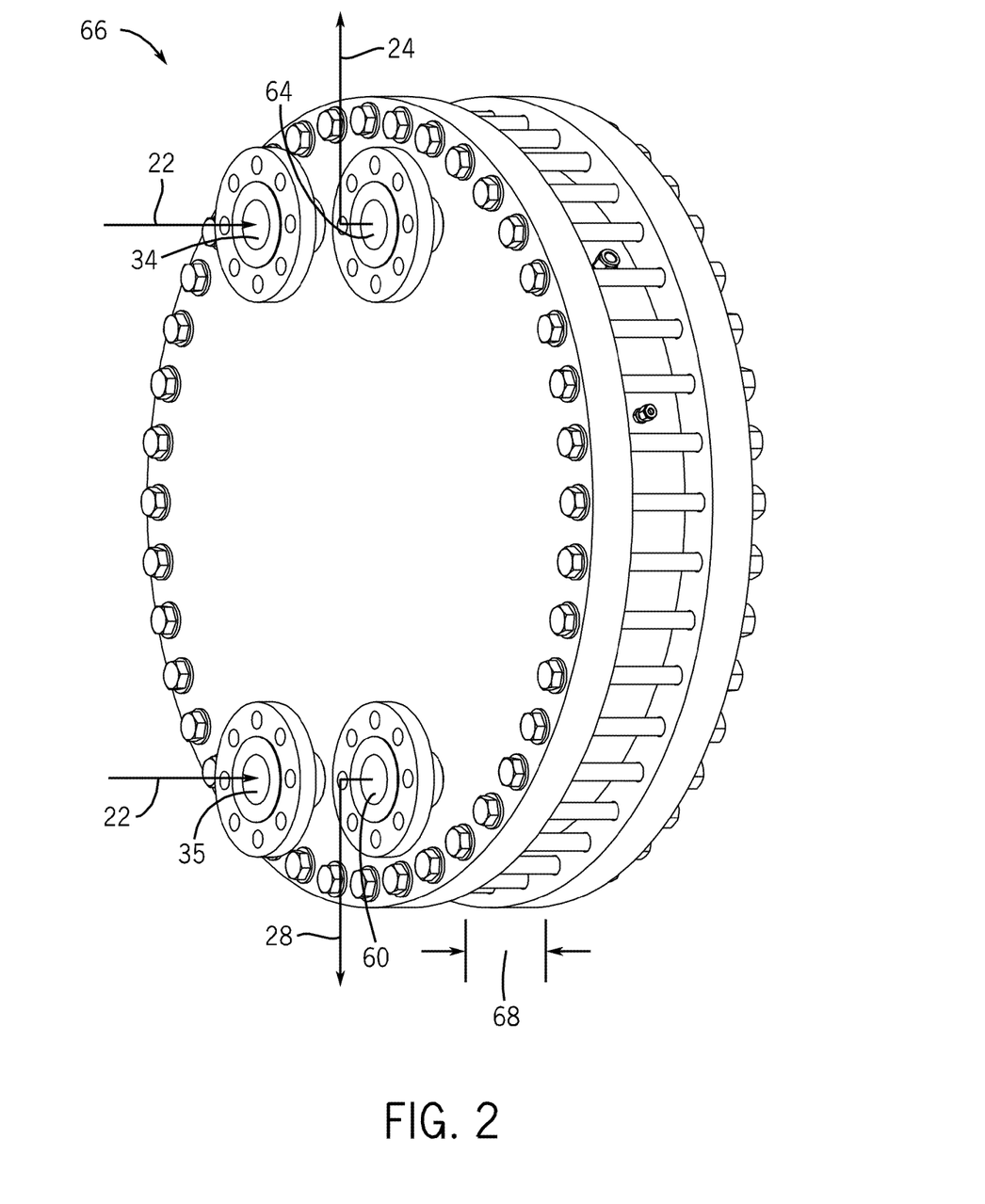
FIG. 2 is a perspective view of an exemplary assembled electrolyzer.

The electrolyzer stack 18 may be mounted in an enclosure as illustrated in FIG. 2, forming an electrolyzer 66. The electrolyzer 66 has connections for the inlet channels 34, 35 to allow the flow of electrolyte solution 22 into the electrolyzer 66. The electrolyzer 66 also has connections for the oxygen outlet channel 60 to allow the oxygen stream 28 to be removed, and the hydrogen outlet channel 64 to allow the hydrogen stream 24 to be removed. In the illustrated embodiment, the structure forms a pressure vessel, and the connections are flanged connections for interfacing with mating piping. Other physical configurations may, of course, be envisaged. Generally, in a presently contemplated embodiment, the thickness 68 of the electrolyzer 66 may be about 150 cm, but the actual size and dimensions will vary depending upon the number of electrolyzer cells used. The details of the electrolyzer 66 may be seen more clearly in FIG. 3.

Figure 3:
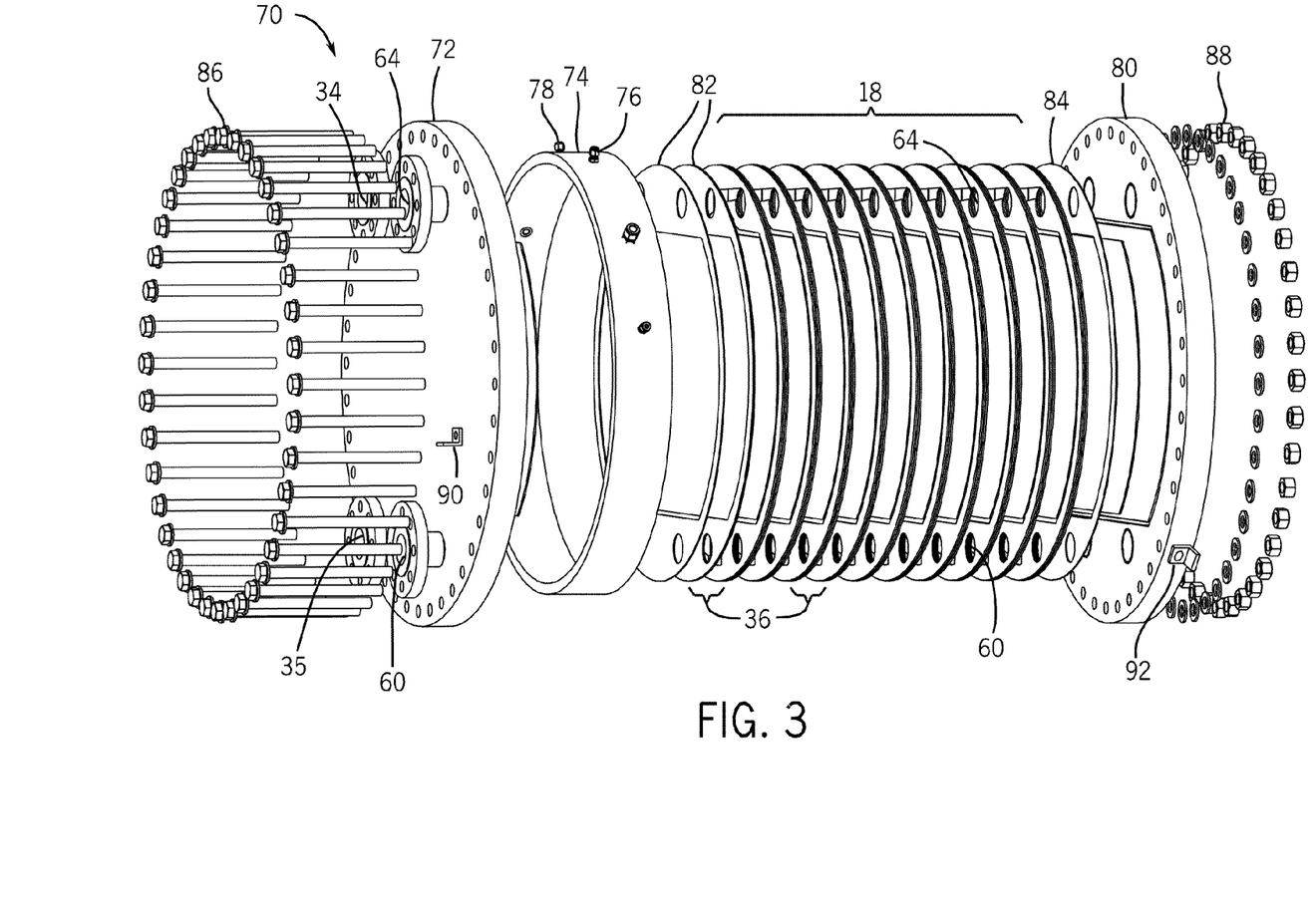
FIG. 3 is an exploded view of the electrolyzer of FIG. 2, showing the individual parts of the assembly.

FIG. 3 is an exploded view 70 showing the individual parts of the electrolyzer. As shown in this view, the electrolyzer has an end cap 72, which has connections to the inlet channels 34, 35 and outlet channels 60, 64. The body 74 of the electrolyzer has a number of connectors 76 mounted along the periphery to allow pressure to be applied during operation. The pressure applied is outside of the electrolyzer stack 18 (within the body 74) to reduce hoop stress on the electrolyzer stack 18 by generally equalizing or reducing the pressure differential between the interior and exterior regions of the stack. Other connectors 78 may be used for the insertion of instrumentation to monitor the performance of the electrolyzer 66.

The electrolyzer stack 18 is formed by joining the electrolyzer cells 36 together to form a single unit, with the holes in each of the electrolyzer cells 36 aligned to form the inlet channels 34, 35 and outlet channels 60,64. The individual electrolyzer cells 36 may be joined by various means, but in the present technique, they are joined by welding via conductors embedded within the cells or provided between the cells as described below. Accordingly, the use of conductors to weld the components together is discussed with respect to FIG. 4 below. Materials that may be used to form the electrolyzer cells 36 are also discussed with respect to FIG. 4 below.

A base plate 80 is mounted against the body 74 opposite the end cap 72. The end cap 72, base plate 80, and body 74 may be constructed from any suitable materials, such as stainless steel, hastalloy, nickel, and so forth. Further, the parts do not have to be made from metal, as a high performance plastic may provide sufficient properties. Suitable high performance plastics may include, for example, polyphenylene sulfide (PPS) or poly(ether-ether-ketone) (PEEK), among others. Moreover the parts may be made of the same material or may be of different materials. For example, the end cap 72 and the base plate 80 may be made from stainless steel, while the body 74 may be made from a high-performance plastic, thereby insulating the end cap 72 from the base plate 80. The end cap 72 may also be insulated from the base plate 80 by the use of gaskets (not shown) between end cap 72, the body 74, and the base plate 80.

One or more spacer plates 82 may be inserted to insulate the electrolyzer stack 18 from the end cap 72 or to provide pressure on the electrolyzer stack 18. Further, a gasket 84 may be inserted to add additional pressure, or to insulate the stack from the base plate 80. The entire assembly may be held together by bolts 86 inserted through the end cap 72 and base plate 80, which are joined to nuts 88 after insertion through the base plate 80. A power terminal 90 may be welded onto the end cap 72 which may then function as one of the current collectors 40, 44. Another power terminal 92 welded onto the base plate 80 may allow the base plate 80 to function as the oppositely charged current collector.

Figure 4:
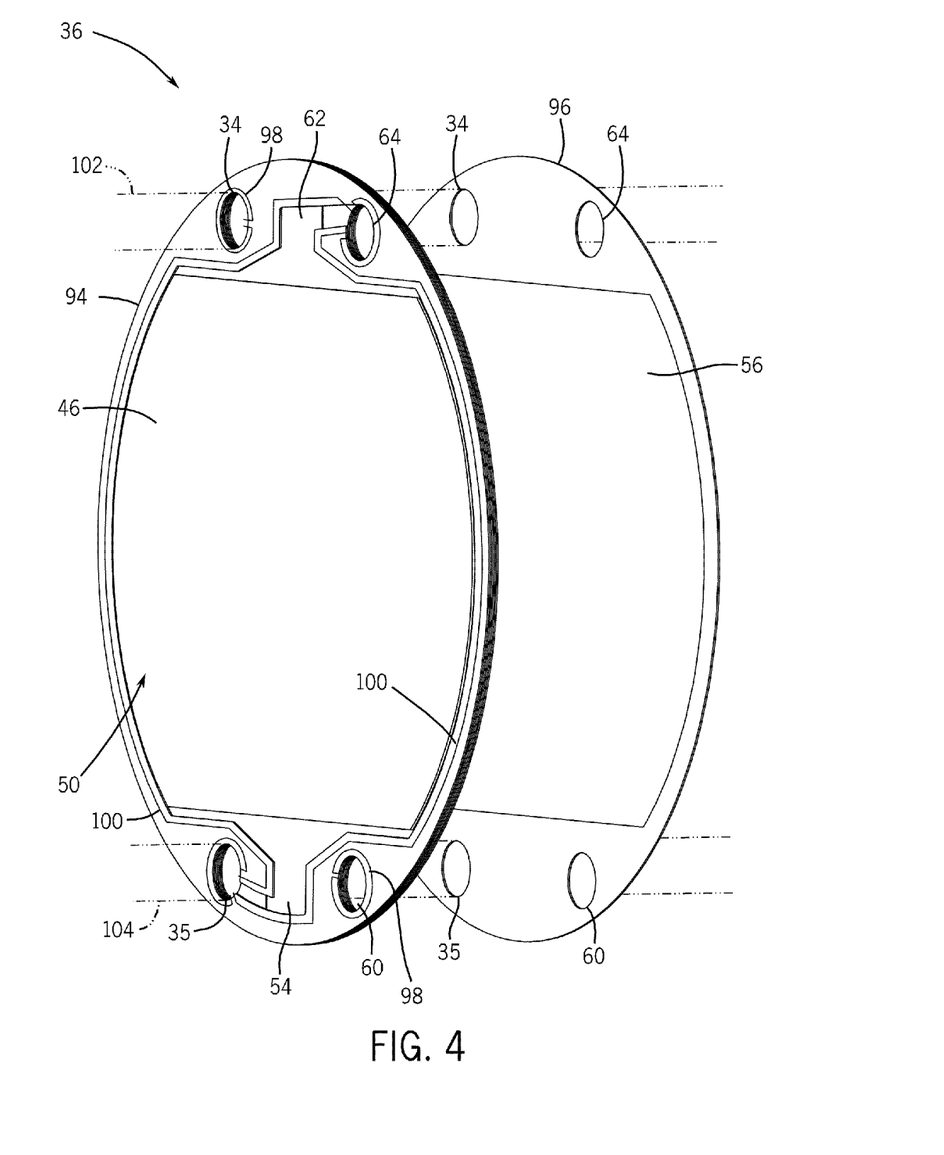
FIG. 4 is a perspective view of an exemplary electrolyzer cell that may be used in the electrolyzer of FIG. 3, showing an exemplary location for conductors used to form a weld.

An individual electrolyzer cell 36 that may be used in the electrolyzer stack 18 is shown in the perspective view of FIG. 4. The electrolyzer cell 36 generally includes two components, an electrode assembly 94 mounted to a diaphragm assembly 96. Both assemblies 94, 96 have holes which align with one another, and with other electrolyzer cells to form the inlet channels 34, 35 and the outlet channels 60, 64. The electrode assembly 94 holds the metal plate 46 that forms the bipolar electrode. One side of the electrode assembly 94 has the channel 54 molded in to direct flow of the electrolyte from one of the inlet channels 35 across the cathodic surface 50 of the metal plate 46. The flow with entrained hydrogen bubbles is then directed to the hydrogen outlet channel 64 via hydrogen channel 62, which may also be molded into the electrode assembly 94. An analogous set of channels on the opposite side of the metal plate 46 directs the flow of oxygen 16.

The electrode assembly 94 and the diaphragm assembly 96 may be made from any number of materials, and in a presently contemplated embodiment, include a peripheral frame made of a non-conductive, chemically resistant plastic. The plastic material may generally be chemically resistant to an oxidative environment, a reducing environment, an acidic environment, a basic environment, or any combination thereof. For example, the frames of the assemblies 94, 96, may be made from polyimides, polyamides, polyetheretherketones, polyethylenes, fluorinated polymers, polypropylenes, polysulfones, polyphenylene oxides, polyphenylene sulfides, polyphenylethers, polystyrenes, polyether imides, epoxies, polycarbonates, impact-modified polyethylene, impact-modified fluorinated polymers, impact-modified polypropylenes, impact-modified polysulfones, impact-modified polyphenylene oxides, impact-modified polyphenylethers, impact-modified polyphenylene sulfides, impact-modified polystyrene, impact-modified polyetherimide, impact-modified epoxies, impact-modified polycarbonates, or any combinations thereof. Other polymers that may be used include high performance blends, such as Noryl, which is a blend of polyphenylether and polystyrene (PS) (available from SABIC Innovative Plastics of Pittsfield, Mass.).

The diaphragm assembly 96 may be joined to the electrode assembly 94 to form the electrolyzer cell 36. The two assemblies 94, 96 may be joined by any of the techniques used to form the electrolyzer stack 18, as discussed with respect to FIG. 3, and in a presently contemplated embodiment, these are joined by melting the materials of the assembly to weld the components together, such as via conductors in or between the components. The diaphragm assembly 96 holds the liquid permeable membrane 56, which prevents mixing of oxygen 16 formed on the anodic surface 48 of the metal plate 56 with hydrogen 14 formed on the cathodic surface 50 of an adjoining metal plate.

The electrolyzer cell 36 may have conductors 98, such as resistance wires, laid over the surface surrounding one or more of the channels to form a weld to an adjoining electrolyzer cell 36. Other conductors 100 may be laid over the surface to surround the flow paths 54 and 62, as well as around metal plate 46. The conductors 98, 100 may be tacked or glued in place. Alternatively, the conductors 98, 100 may be laid on a surface of a mold, after which a plastic may be injected or otherwise formed to at least partially embed the conductors to form the electrode assembly 94. In this case, the conductors 98, 100 may be incorporated into the top millimeter or millimeters of the surface, as the zone of melted plastic material around the conductor during the welding process may be about 2 to about 3 times the diameter of the wire.

The conductors 98, 100 may be any type, such as wire that generates heat when an electric current or field is applied to it. For example, the conductors may be made from nickel-copper alloys, nickel-chromium alloys, and the like, with the heat generation controlled by the thickness and length of the wire. The thickness of the conductors 98, 100 may be about 12 gauge, 16 gauge, 20 gauge, 24 gauge, or 26 gauge, or any other appropriate thickness for generating the temperature needed to melt and seal the cell material. Alternatively, a tape or a variable resistance wire may be used. Furthermore, an induction wire may be used in similar patterns. To heat the induction wire, a high frequency electromagnetic field may be directed at the part, resulting in melting of the plastic and formation of the seam. Since no DC current is required to heat the induction wires, materials used for assembly of the stack, such as alignment bars 102, 104 passed through the cells to maintain them aligned during assembly, may be made from a non-conducting material, such as a plastic.

The temperature used for the weld depends on the plastic used to form the part. For example, the electrode assembly 94 may be made from a polyphenylether/polystyrene blend (Noryl), which generally has a melt temperature of between about 225 and 255° C. for processing Generally, this plastic may require a temperature of about 300° C. to from a hermetic seal within about 1 minute. Other plastics will generally have different softening temperatures and, thus, will use different temperatures for sealing.

As an example, an electrolyzer cell 36 was made from Noryl. A short, 24 gauge nichrome wire segment was used as the conductors 98 surrounding the isolated inlet and outlet channels 34, 60. This segment consumed about 90 watts of applied power to heat the wire sufficiently to form a weld around each of these channels 34, 60 in about 1 minute. By comparison, a longer 24 gauge wire was used as the conductors 100 around the edge and flow channels. This segment consumed about 330 watts of power applied to heat the wire sufficiently to form a weld in about 1 minute.

Generally, the electrode assembly 94 and diaphragm assembly 96 are joined together to form the electrolyzer cell 36 before the electrolyzer stack 18 (FIG. 3) is assembled into a single unit. However, conductors may also be laid around the edge and flow channels of the diaphragm assembly 96, to allow for simultaneously welding both the electrolyzer cell 36 and the electrolyzer stack 18 together in one operation.

The electrolyzer cell 36 may be threaded over alignment bars 102, 104 inserted through the channels 34 and 35 to align the electrolyzer cell 36 with adjoining electrolyzer cells 36, forming the electrolyzer stack 18. Other alignment bars (not shown) may be inserted through channels 60 and 64. The alignment bars 102, 104 may also be used to energize (i.e., apply a current to) the conductors 98, 100. This may be performed by conductive paths (not shown) located along the alignments bars 102, 104 that make contact with the conductors 98, 100. To energize the single wire paths shown for the conductors 98 in FIG. 4, both voltage connections are located within each of the channels 34, 60. Conductors 100 may be energized by a connection located in a single channel 35 and another connection within another channel 64. Other configurations may use a more complex arrangement of the resistance wires to simplify connections within the channels. It should be noted that any desired form of power may be applied to the conductors to sufficiently melt the cell material to form the desired welds, including both DC and various AC waveforms.

Figure 5:
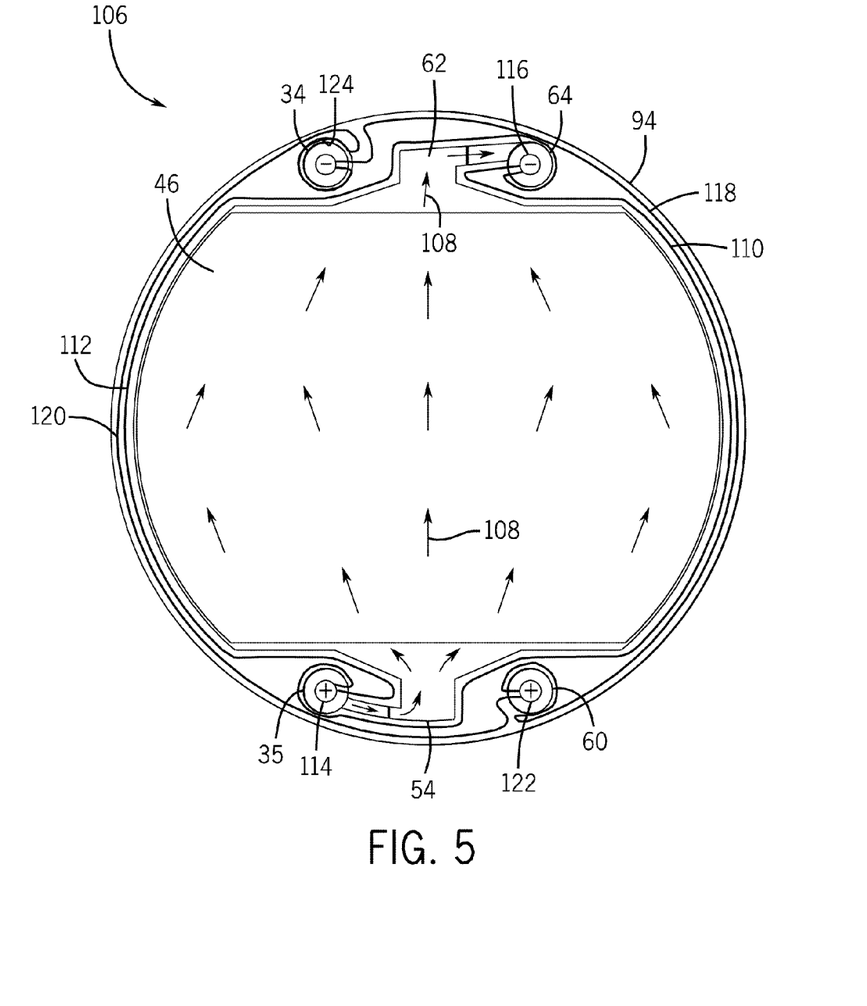
FIG. 5 is a front view of the exemplary electrolyzer cell, showing another exemplary location for conductors used to form a weld.

As shown in the front view 106 of the electrode assembly 94 in FIG. 5, a dual wire path may be laid over the electrode assembly 94, in which a single connection is located within each channel 34, 35, 60, and 64. The front view 106 illustrates the flow 108 of electrolyzer solution 22 from the inlet channel 35, through the molded channel 54, across the metal plate 46, and out the hydrogen channel 62 to the hydrogen outlet channel 64. To seal the flow 108, a conductor 110 may be placed around the flow path, between the inlet channel 35 and the hydrogen outlet channel 64. A second conductor 112 is then laid around the opposite side of the flow path, also between the inlet channel 35 and the hydrogen outlet channel 64. These conductors 110, 112 may be energized by alignment bars 114, 116 inserted through the inlet channel 35 and the outlet channel 64. Generally, one alignment bar 114 may be connected to a positive terminal of a DC power supply, while the other alignment bar 116 may be connected to the negative terminal. To seal the remaining channels 34, 60, a second set of conductors 118, 120 may be placed around the perimeter of the electrode assembly 94, between the two channels 34, 60. To energize these conductors 118, 120, an alignment bar 122 connected to the negative terminal of a direct current (DC) power supply, may be inserted into the oxygen outlet channel 60. Another alignment bar 124 may be inserted into the other inlet channel 34 and connected to the positive terminal of the DC power supply. One of ordinary skill in the art will recognize that these power configurations are not limiting and that any number of different configurations may be used to apply voltage, current or a field to the conductors 110, 112, 118, and 120, including the use of an AC power supply.

Figure 6:
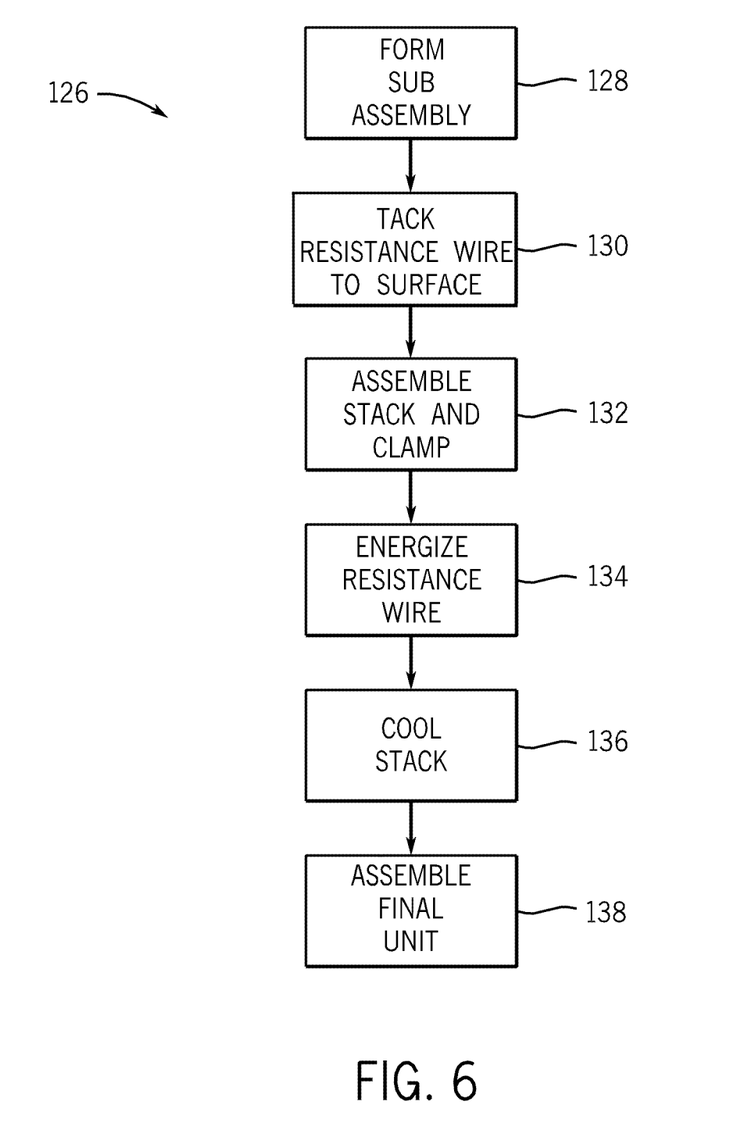
FIG. 6 is a flow chart illustrating exemplary steps in a process for making an electrolyzer assembly using conductors to weld electrolyzer cells together, according to an embodiment of the present techniques.

A process 126 that may be used to form sealed structures, in accordance with embodiments, is shown by the flow chart in FIG. 6. The process 126 begins with the formation of the sub-assemblies (block 128), such as the electrolyzer cells 36. Conductors may then be laid out over a surface of the sub-assembly and tacked into place (block 130). Generally, the wires may be arranged in any number of patterns to seal internal structures, such as the patterns discussed with respect to FIG. 4 or 5 above. Further, as discussed above, the wires may be molded directly into the sub-assembly when it is formed.

After the conductors have been arranged onto the structure and tacked into place, the electrolyzer cells 36 may be threaded onto the alignment bars to align the stack. Once the electrolyzer cells 36 are in place, pressure may be applied (block 132) to the ends of the electrolyzer stack 18 to hold the electrolyzer cells 18 tightly together. A current may then be applied to the conductors through the alignment bars to energize the conductors (block 134) and melt the plastic surrounding the resistance wires. The pressure on the electrolyzer stack 18 then forms hermetically sealed joints between the electrolyzer cells 36.

The electrolyzer stack is cooled (block 136) forming a single unit with a smooth plastic exterior. The locations of the ends of the conductors within the inlet channels 34, 35 and outlet channels 60, 64 prevent any leak paths or rough edges that may get caught on the body. The welded electrolyzer stack 18 may then be assembled into the electrolyzer 66 (block 138) by insertion of the electrolyzer stack 18 into the body 74 followed by the mounting of the end cap 72 and base plate 80. The alignment of the different parts of the electrolyzer 66, such as the electrolyzer stack 18, the end cap 72 and base plate 80, may be maintained by threading the parts over the alignment bars. The bolts 86 may then be threaded through the end cap 72 and base plate 80 and joined to the nuts 88 prior to removal of the alignment bars.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for forming an electrolyzer comprising:
disposing a heat-generating element adjacent to a surface of an electrolyzer cell component comprising an electrode assembly, wherein the heat-generating element directly abuts a plurality of inlet apertures and outlet apertures of the electrode assembly;
positioning the surface of the electrolyzer cell component in contact with a surface of an adjoining electrolyzer cell component comprising a diaphragm assembly such that the heat-generating element is disposed adjacent to a diaphragm of the diaphragm assembly;
heating the heat-generating element to soften the surface of the electrolyzer cell component and form a fused interface between the electrode assembly and the diaphragm assembly about the diaphragm;
heating the heat-generating element to form a fused interface between the electrode assembly and the diaphragm assembly directly about the inlet apertures to form inlet channels; and
heating the heat-generating element to form a fused interface between the electrode assembly and the diaphragm assembly directly about the outlet apertures to form outlet channels, wherein the heat-generating element is heated by current applied to at least one alignment bar of a plurality of alignment bars inserted through fluid passages of the electrolyzer cell component.

2. The method of claim 1, wherein the electrolyzer cell component is shaped to form a sealed internal fluid passage when the fused interface is formed.

3. The method of claim 1, wherein the heat-generating element includes an electrical conductor.

4. The method of claim 3, wherein the electrical conductor is heated by application of a voltage to the conductor.

5. The method of claim 1, wherein the heat-generating element is embedded in the electrolyzer cell component.

6. The method of claim 1, wherein the heat-generating element is applied to the surface of the electrolyzer cell component.

7. The method of claim 1, wherein the heat-generating element comprises a wire made of a nickel chromium alloy, a nickel copper alloy, or both.

8. The method of claim 1, wherein the electrolyzer cell component comprises a plastic material that is chemically resistant to an oxidative environment, a reducing environment, an acidic environment, a basic environment, or any combination thereof.

9. The method of claim 1, wherein the electrolyzer cell component comprises polyimides, polyamides, polyetheretherketones, polyethylenes, fluorinated polymers, polypropylenes, polysulfones, polyphenylene oxides, polyphenylene sulfides, polyphenylethers, polystyrenes, polyether imides, epoxies, polycarbonates, impact-modified polyethylene, impact-modified fluorinated polymers, impact-modified polypropylenes, impact-modified polysulfones, impact-modified polyphenylene oxides, impact-modified polyphenylethers, impact-modified polyphenylene sulfides, impact-modified polystyrene, impact-modified polyetherimide, impact-modified epoxies, impact-modified polycarbonates, or any combination thereof.

10. A method of assembling an electrolyzer stack comprising
forming a plurality of electrolyzer cells, wherein each electrolyzer cell comprises an electrode assembly and a diaphragm assembly;
disposing a conductor adjacent to a surface of one of the electrode assembly or the diaphragm assembly of each of the electrolyzer cells;
positioning the plurality of electrolyzer cells in contact with each another to form an electrolysis stack such that the conductor directly abuts a plurality of inlet apertures and outlet apertures of the electrode assembly and is adjacent to a diaphragm of the diaphragm assembly;
heating the conductor to soften the surface of each of the electrolyzer cells to form a fused interface between each electrode assembly and diaphragm assembly about the diaphragm;
heating the conductor to form a fused interface between each electrode assembly and diaphragm assembly directly about the inlet apertures to form inlet channels; and
heating the conductor to form a fused interface between each electrode assembly and diaphragm assembly directly about the outlet apertures to form outlet channels, wherein the conductor is heated by current applied to at least one alignment bar of a plurality of alignment bars inserted through fluid passages of the electrolyzer cells.

11. The method of claim 10, wherein the electrolyzer cells are shaped to form a sealed internal fluid passage when the fused interfaces are formed.

12. The method of claim 10, wherein the conductor is heated by application of a voltage to the conductor.

13. The method of claim 10, wherein the conductor is embedded in each electrolyzer cell.

14. The method of claim 10, wherein each electrode assembly comprises a metal plate and each diaphragm assembly comprises a liquid permeable membrane.

15. An electrolyzer comprising:
a plurality of electrolyzer cells adjacent to one another to form internal fluid channels comprising inlet channels and outlet channels for channeling an electrolyte and oxygen and hydrogen separated from water, wherein each electrolyzer cell comprises an electrode assembly and a diaphragm assembly; and
a plurality of heat-generating elements adjacent to a surface of one of the electrode assembly or the diaphragm assembly of each of the electrolyzer cells, wherein the plurality of heat-generating elements directly abut the inlet channels, the outlet channels, and a diaphragm of the diaphragm assembly, wherein the plurality of heat-generating elements are configured to be heated to fuse each electrode assembly and diaphragm assembly directly about the inlet channels, directly about the outlet channels, and directly about the diaphragm, wherein the heat-generating elements are configured to be heated by alignment bars inserted through fluid passages of the electrolyzer cells.

16. The electrolyzer of claim 15, wherein the plurality of heat-generating elements include wires embedded in the electrolyzer cells.

17. The electrolyzer of claim 15, wherein the heat-generating elements include wires disposed between the electrode assembly and the diaphragm assembly.

* * * * *